(12) United States Patent
Feierbach

(10) Patent No.: US 7,107,471 B2
(45) Date of Patent: Sep. 12, 2006

(54) METHOD AND APPARATUS FOR SAVING POWER IN PIPELINED PROCESSORS

(75) Inventor: Gary F. Feierbach, Belmont, CA (US)

(73) Assignee: Apple Computer, Inc., Cupertino, CA (US)

( * ) Notice: Subject to any disclaimer, the term of this patent is extended or adjusted under 35 U.S.C. 154(b) by 559 days.

(21) Appl. No.: 09/814,321

(22) Filed: Mar. 21, 2001

(65) Prior Publication Data

US 2002/0138777 A1 Sep. 26, 2002

(51) Int. Cl.
*G06F 1/04* (2006.01)

(52) U.S. Cl. ............. 713/324; 713/300; 709/102; 712/220

(58) Field of Classification Search ......... 713/324, 713/300; 712/220; 709/102
See application file for complete search history.

(56) References Cited

U.S. PATENT DOCUMENTS

| | | | | |
|---|---|---|---|---|
| 5,392,437 A | * | 2/1995 | Matter et al. | 713/324 |
| 5,495,617 A | * | 2/1996 | Yamada | 713/323 |
| 5,787,297 A | * | 7/1998 | Lin | 713/322 |
| 5,825,674 A | * | 10/1998 | Jackson | 713/321 |
| 6,029,006 A | | 2/2000 | Alexander et al. | 395/750.05 |
| 6,088,808 A | | 7/2000 | Iwamura et al. | 713/324 |
| 6,122,722 A | | 9/2000 | Slavenburg | 712/24 |
| 6,219,796 B1 | * | 4/2001 | Bartley | 713/320 |
| 6,247,134 B1 | | 6/2001 | Sproch et al. | |
| 6,308,241 B1 | * | 10/2001 | Simovich et al. | 711/118 |
| 6,550,000 B1 | * | 4/2003 | Minematsu et al. | 712/215 |
| 6,611,920 B1 | * | 8/2003 | Fletcher et al. | 713/322 |

* cited by examiner

*Primary Examiner*—Lynne H. Browne
*Assistant Examiner*—Tse Chen
(74) *Attorney, Agent, or Firm*—Beyer Weaver & Thomas LLP

(57) ABSTRACT

Techniques for reducing power consumption in pipelined processors are described. As a method, one embodiment of the present invention reduces power requirements in a pipelined processor by evaluating instructions to be executed to determine the operation type of the instructions, producing activity indicators based upon the operation types of the instructions, and controlling the supply of current to each of the stages such that only selected stages draw current from a power supply.

9 Claims, 6 Drawing Sheets

(at $t_1$)

(at $t_2$)

(at $t_3$)

(at $t_4$)

(at $t_5$)

METHOD AND APPARATUS FOR SAVING POWER IN PIPELINED PROCESSORS

CROSS-REFERENCE TO RELATED APPLICATION

Not Applicable.

STATEMENT REGARDING FEDERALLY SPONSORED RESEARCH OR DEVELOPMENT

Not Applicable

FIELD OF THE INVENTION

The present invention relates generally to piplelined processors and, more specifically, to reducing power consumption during the operation of pipelined processors.

BACKGROUND OF THE INVENTION

Processor architectures utilizing multiple functional units are suitable alternatives for exploiting instruction-level parallelism (ILP) in programs, that is, for executing more than one basic (primitive) instruction at a time and thereby allowing for faster microprocessors. One type of processor architecture utilizing multiple functional units is a Very-Long Instruction Word (VLIW) processor. VLIW processors fetch a Very-Long Instruction Word, which contain several primitive instructions, from an instruction cache and dispatch the entire VLIW for parallel execution by the functional units. These capabilities can be exploited by compilers, which generate code that has grouped together independent primitive instructions executable in parallel. The processors have relatively simple control logic because they do not perform any dynamic scheduling or reordering of operations (as is the case in most contemporary superscalar processors). In hardware terms, a VLIW processor very simply consists of a collection of functional units (adders, multipliers, branch units, etc.) connected by a bus, plus some registers and caches.

The instruction set for a VLIW architecture tends to consist of simple instructions. The compiler must assemble many primitive operations into a single "instruction word" such that the multiple functional units are kept relatively busy, which requires enough instruction-level parallelism (ILP) in a code sequence to fill the available operation slots. Such parallelism is uncovered by the compiler through scheduling code speculatively across basic blocks, performing software pipelining, reducing the number of operations executed, among others.

As with all computer architectures, it is important to design VLIW processors to have lower power consumption. Electronic systems having lower power consumption have various advantages such as reduced operational costs, lower amounts of heat dissipation, and longer operational lives for systems running on batteries. One conventional method for saving power has been to simply to discontinue the supply of power to entire functional units, for example, by discontinuing the flow of current to these units. Another conventional method for saving power in VLIW processors has been implemented by selectively discontinuing the supply of power to sections of a functional unit that perform specific functions. For example, a floating-point functional unit generally has "functional sections" for addition, subtraction, division, multiplication, square root, etc. According to this convention, each "functional" section that is not required to perform its specific function will have its supply of power or clocking discontinued until that "functional" section of the functional unit is needed again. Even though these conventional approaches reduce the amount of power required by VLIW processors, they leave great room for improvement with respect to power conservation. For example, these conventional approaches require that an entire "functional section" or functional unit be supplied with power even though only a small portion of the "functional section" or pipe stage of the functional unit is being utilized.

In view of the foregoing, there is a need for pipelined processors capable of operating with reduced power consumption.

SUMMARY OF THE INVENTION

The present invention reduces power consumption in pipelined processors, for example, Very Long Instruction Word processors. In one embodiment of the invention, power consumption is reduced by causing only selected sections of the functional units to draw current from a power source. Specifically, the functional units will be controlled such that only selected stages of the functional units will draw current. The reduction in power requirements facilitated by the present invention can also serve to significantly reduce the amount of heat dissipated by the hardware system implementing the invention. Reducing heat dissipation is a major factor that may allow for the reduction of the size of microelectronic devices. Power reduction can also allow battery discharge cycle lengths to be extended. Obviously, both the heat dissipation and battery life improvements are very desirable results.

As a method, one embodiment of the present invention includes at least the operation of evaluating instructions to be executed to determine the operation type of the instructions, producing activity indicators based upon the operation types of the instructions, and controlling each of the stages such that only selected stages draw current from a power supply. The controlling of the supply of current is based upon activity indicators that are associated with each of the stages.

As an apparatus, one embodiment of the present invention includes at least an instruction evaluation unit that evaluates a next instruction to be executed and which produces activity indicators, a functional unit for executing instructions, the functional unit having a plurality of stages, each of the stages capable of being separately activated or deactivated based upon a respective activity indicator, and a stage activation controller that utilizes the activity indicators and causes each of the stages to be activated or deactivated.

These and other features and advantages of the present invention will be presented in more detail in the following specification of the invention and the accompanying FIGS., which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention reduces power consumption in pipelined processors, for example, Very Long Instruction Word processors. The present invention is especially useful for reducing power consumption in pipelined processors having more than one pipelined functional unit. In one embodiment of the invention, power consumption is reduced by causing only selected sections of the functional units to draw current from a power source. Specifically, the functional units will be controlled such that only selected stages of the functional units will draw current. Controlling the power consumption of functional units at the stage level allows for greater power savings, as compared to conventional methods of power conservation, due to the finer granularity of control over the logic. As a method, one embodiment of the present invention includes at least the operation of evaluating instructions to be executed to determine the operation type of the instructions, producing activity indicators based upon the operation types of the instructions, and controlling each of the stages such that only selected stages draw current from a power supply. In this regard, it should be understood that power is applied to all stages and thus tend to draw some leakage current even when no state changes occur. However, the invention operates to control stages such that state changes in their logic often do not occur and thus substantial amounts of current are not consumed in making such state changes. Hence, references to "current draw" pertain to substantial current draw to cause state changes.

The reduction in power requirements facilitated by the present invention can also serve to significantly reduce the amount of heat dissipated by the hardware system implementing the invention. Reducing heat dissipation is a major factor that may allow for the reduction of the size of microelectronic devices. Power reduction can also allow battery discharge cycle lengths to be extended. Obviously, both the heat dissipation and battery life improvements are very desirable results.

Figure 1:
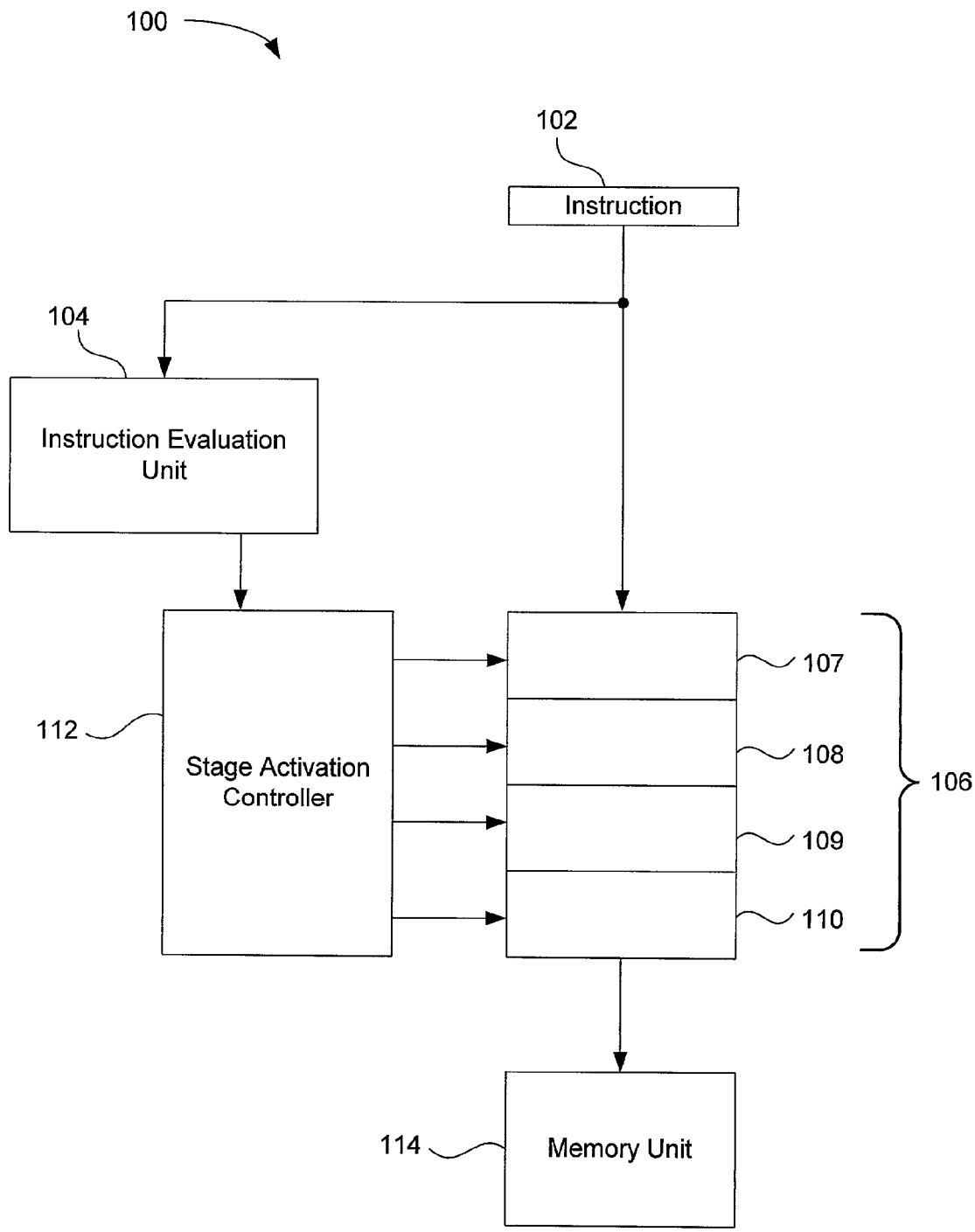
FIG. 1 illustrates a basic layout of a computer processor architecture according to one embodiment of the present invention.

A general explanation of the present invention is now presented with respect to FIG. 1. FIG. 1 illustrates a basic layout of a computer processor architecture according to one embodiment of the present invention. An instruction 102 enters a computing system 100 at two points, the instruction evaluation unit 104 and the functional unit 106. The instruction evaluation unit 104 evaluates the instruction 102 for its operation type, which may be either an operation instruction or a no-operation instruction. The functional unit 106 will then process the instruction 102 by pipelining the instruction 102 through each of the individual functional stages 107–110. A stage activation controller 112 receives a signal as to the instruction type from the instruction evaluation unit 104 thereby causing another set of signals to be transmitted to each stage of the functional unit 106.

The signals transmitted from the instruction evaluation unit 104 to the functional unit 106 determine whether or not each of the stages 107–110 will receive a clock signal. Clock signals are continuous and precisely spaced changes in voltage that are used to synchronize operations of an electronic system. Clock signals are only sent to the stages 107–110 that will execute an operation type instruction. These clock signals cause the respective stages to change state (i.e., the loading of new values in memory units and the processing of bit values in clusters of logic). Clock signals are not sent to the stages that will not execute operation type instructions. These non-clocked stages therefore will not change state. As is commonly known, CMOS circuitry and other similar complementary type circuits only draw current during the time in which it changes state. The present invention therefore reduces the power requirements of pipelined processors by sending clock signals only to stages of functional units that execute operation type instructions. Power consumption is reduced because the number of stages executing operation type instructions is generally less than the total number of stages. In addition, the clock distribution circuitry itself also draws significant power. So, additional power is saved by selectively disabling clock circuitry on stages that do not need processing power. It is noted that the power savings techniques of the present invention are well suited for VLIW architectures because many of the functional unit stages are idle during each instruction dispatch. As should be appreciated, minor amounts of current will inevitably be drawn by the stages that do not execute operation instructions due to current leakage.

At the end of the pipelined functional unit 106, the operands and/or results of the instruction 102 are transmitted to the memory unit 114.

It should be understood that the present invention may be designed to control the stages of functional units such that stages that contain any instruction type not requiring operation of that stage do not draw current from a power source. Although the discussion herein is focused on no-operation instructions, it should be understood that, instruction types other than no-operation instruction types may allow stages to not draw current from a power source.

Figure 2:
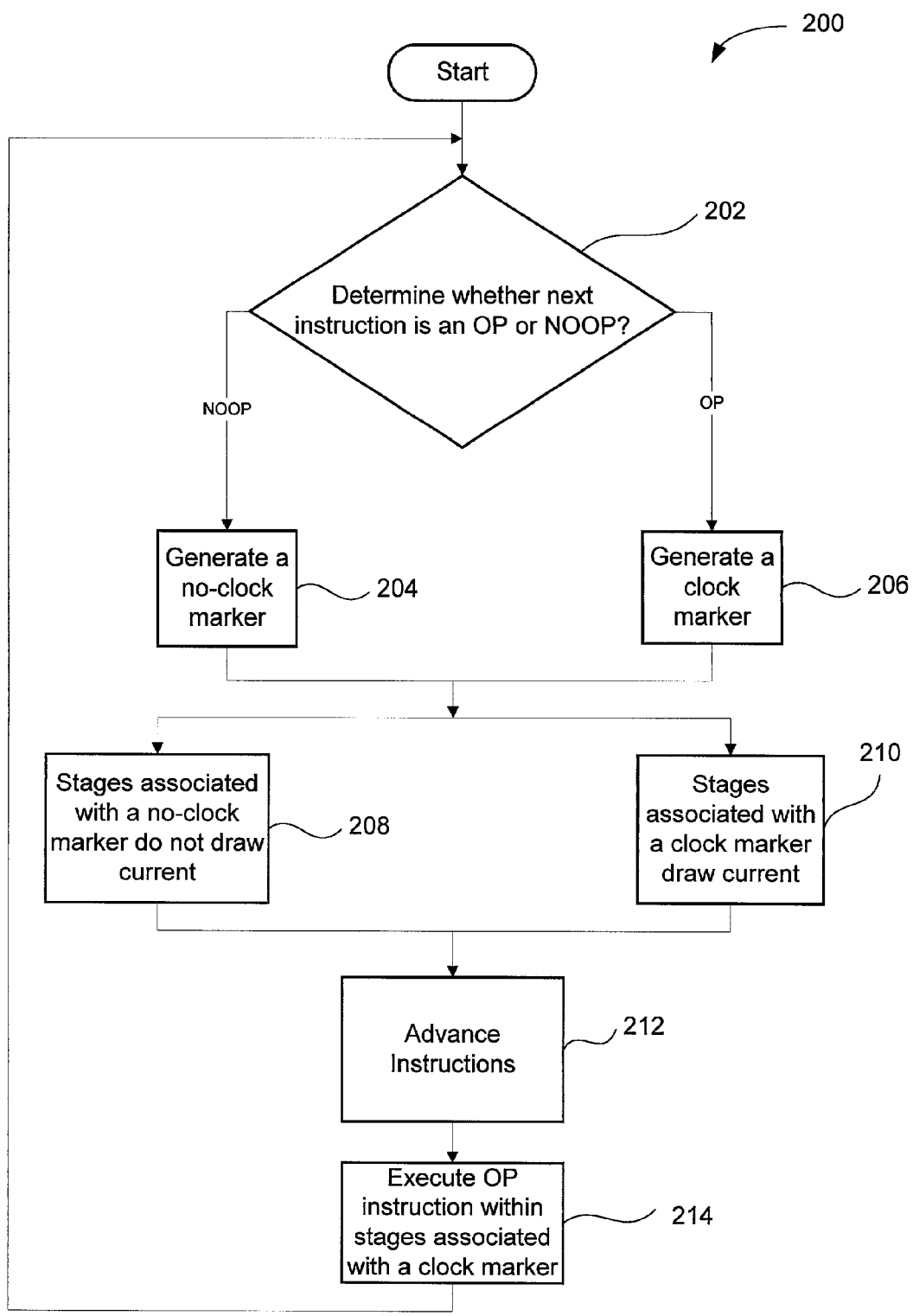
FIG. 2 illustrates a process represented by a flow diagram, which represents the order of and the processes for reducing the power requirements of a VLIW processor according to one embodiment of the present invention.

It should be appreciated that various power supply scenarios are possible during any given time during the operation of the VLIW processor, or any pipelined processor. For example, one common scenario is characterized when at least some of the stages of the functional units do not draw current from a power source. Two other scenarios are characterized when: 1) all of the stages of the functional units draw current and when 2) none of the stages of the functional units draw current. FIG. 2 will now be discussed to provide a more detailed understanding of the method for which to operate the inventive computing system 100.

FIG. 2 is a flow diagram illustrating a process 200 for reducing the power requirements of a pipelined processor according to one embodiment of the present invention. The process 200 can, for example, be performed by the computer system 100 of FIG. 1. The process 200 is an iterative process in that the process repeats for each new instruction to be executed by the functional units (e.g., functional unit 106 of FIG. 1). Each new cycle of the process 200 starts at decision block 202 where a determination is made as to whether the new instruction is an operation type or a no-operation type instruction. This determination may be made by various methods, for example, by evaluating certain bits within the instruction. With reference to FIG. 1, the instruction evaluation unit 104 can make this determination.

If the instruction is determined to be a no-operation type instruction, then a no-clock marker is generated at block 204. A no-clock marker can be a clock disabling bit, for example, a 0-bit value. On the other hand, if the instruction is determined to be an operation type instruction, then a clock marker is generated at block 206. A clock marker can be a clock enabling bit, for example a 1-bit value. Of course, the opposite designation of 1-bit and 0-bit values for no-clock markers and clock markers, respectively, function equally as well. Other designation methods may also be appropriate. With reference to the computing system 100 in FIG. 1, the generated clock and no-clock markers can be sent to the stage activation controller 112. The selected terminology of clock and no-clock marker is not intended to limit the invention to sending clock and no-clock signals because power may be controlled by other mechanisms. Therefore, other terminology, such as "power-on" and "power-off" activity signals may just as well be used in the present description of the invention.

The generated no-clock or clock marker is used to control whether or not the first stage of the functional unit draws current from a power source. The first stage of the functional unit that is first stage in line to process the instruction. With respect to the general convention for referencing the specific stages of functional units, the functional stages are identified in numerical order from first to last. For example, with respect to FIG. 1, functional stage 107 is the first stage and 110 is the fourth and last stage. As new instructions enter the computing system 100, the no-clock and clock markers generated for instructions that already entered the functional unit are continued to be used to control the subsequent stages of the functional unit. The subsequent stages are controlled such that stages containing operation instruction type instructions draw current and stages containing no-operation instruction type instructions do not draw current. With reference to computing system 100 of FIG. 1, stage activation controller 112 utilizes the no-clock and clock markers to control the functional stages 107–110 of functional unit 106.

Very shortly after the stages either draw or do not draw current, the instructions within the functional unit are advanced to the next stage, the next dispatched instruction is entered into the first stage, and the instruction in the last stage exits the functional unit. The advancing of the instructions is represented in block 212. Each stage of the functional unit now executes its newly loaded operation or no-operation type instruction, as shown in block 214. The no-clock markers cause the stages containing no-operation type instructions to draw no current. No current is required by these stages since the logic with the stages is prevented from undergoing state changes. The present invention reduces power requirements of pipelined processors due to its ability selectively control the stages of functional units that will draw current from a power source.

After the execution of the instructions, the flow diagram shows that the process 200 returns to decision block 202 so that the process may repeat to handle the next dispatched instruction.

FIGS. 1 and 2 have illustrated the general concepts of the present invention. Now, FIG. 3 will illustrate a detailed embodiment of piplelined processor architecture 300 having multiple functional units according to one embodiment of the present invention. Architecture 300 may be, for example, a VLIW architecture. As can be seen, seven sets of components similar to the components of computing system 100 of FIG. 1 are embodied within architecture 300. Each set of components is represented by an instruction that is sent to a functional unit 302 and an instruction evaluation unit 304, and the stage activation controller 306 associated with each functional unit 302. From left to right, the functional units 302 in the architecture 300 are those of a first arithmetic logic unit, a second arithmetic logic unit, a multiplier unit, a floating point unit, and units X, Y, and Z. Units X, Y and Z can represent any of a variety of functional units. As should be appreciated, alternative embodiments of the present invention can contain different numbers, combinations and types of functional units. In the processor architecture 300, the instructions are very long instruction words that are stored in an instruction memory unit 308, for example a cache memory device, from which instructions are loaded into an instruction register 310. The instruction register 310 is divided into multiple slots 312, each of which contains a portion of a Very Long Instruction Word (VLIW). Each slot 312 directs its portion of the VLIW to control one or more functional units 302 in the architecture 300. In this specific embodiment, each slot 312 controls a single functional unit 302. FIG. 4 illustrates a representative VLIW instruction 400. VLIW instruction 400 contains a respective instruction for each functional unit 302. Specifically, instruction 400 includes an $ALU_1$ operation, an $ALU_2$ operation, a MUL operation, an FPU operation, operation X, Y and Z. A shared, multi-ported memory device 314 is connected to each of the functional units 302 to receive, transmit and store information, such as operands and results. A program counter 316 is connected to the instruction memory unit 308 to track of the address of the current or next instruction.

Analogously to instruction 102 in FIG. 1, the instructions within each slot 312 of the very long instruction words contain either an operation instruction or a no-operation instruction type. It is of significance that no-operation instruction types are very common in very long instruction word architectures. To take advantage of this fact in order to reduce power consumption, the present invention utilizes instruction evaluation units 304 and stage activation controllers 306 to control the stages such that only those stages that will operate upon an operation type instruction will draw a current. At the same time, the stage activation controller 306 controls the stages that contain no-operation instructions such that they do not draw current. Again, it is this ability to selectively control the stages of the functional units that allows the architecture of the present invention to consume less power.

In alternative embodiments, the plurality of individual instruction evaluation units 304 may be replaced by a single logic unit that is able to generate and transmit instruction type signals to each of the stage activation controllers.

Figure 3:
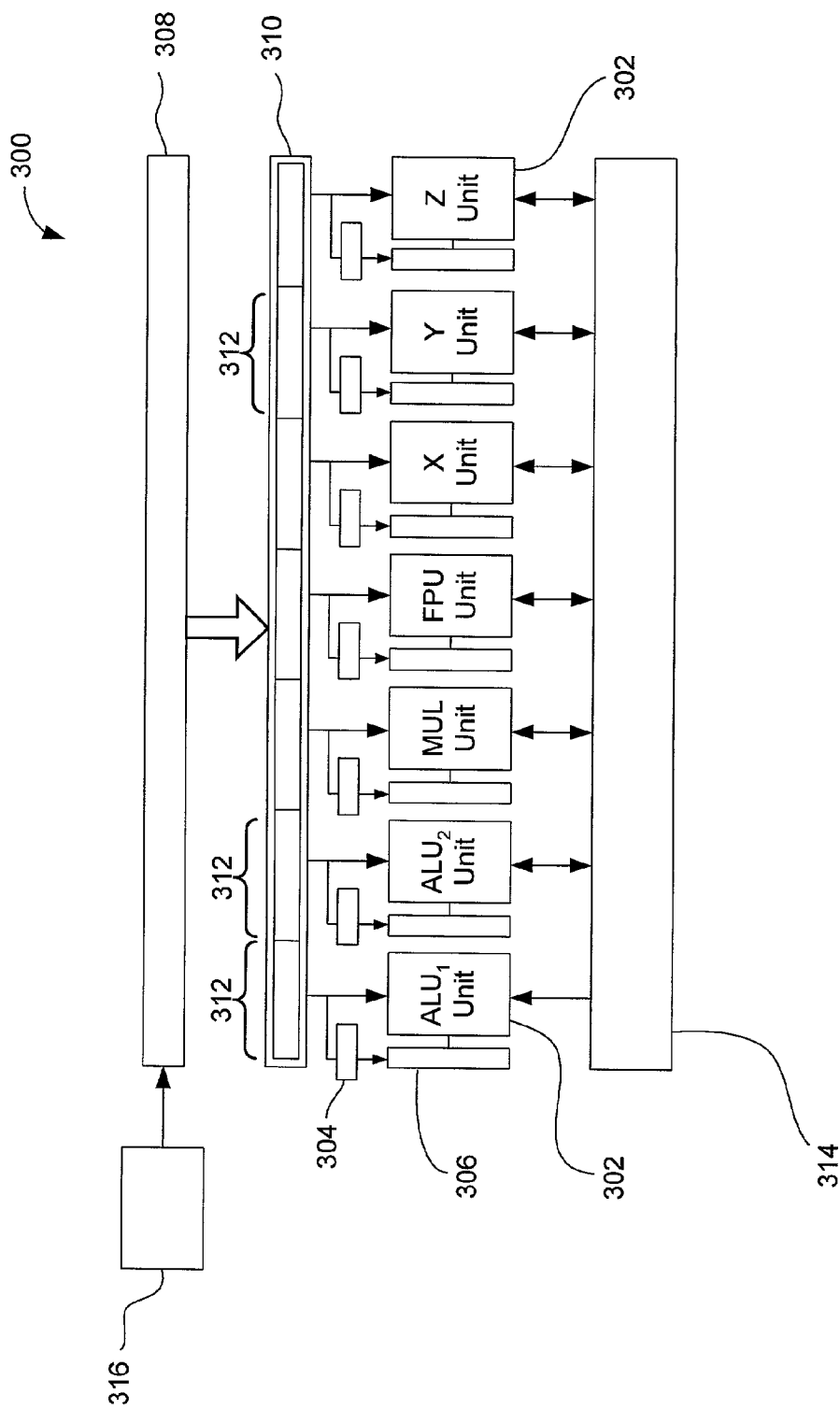
FIG. 3 illustrates a detailed embodiment of a VLIW processor architecture according to one embodiment of the present invention.
Figure 4:
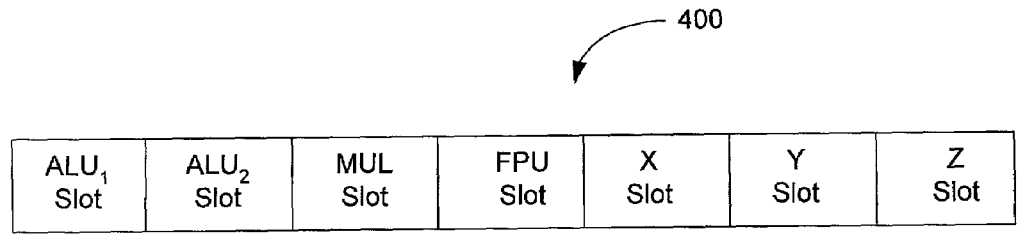
FIG. 4 illustrates a representative VLIW instruction.
Figure 5:
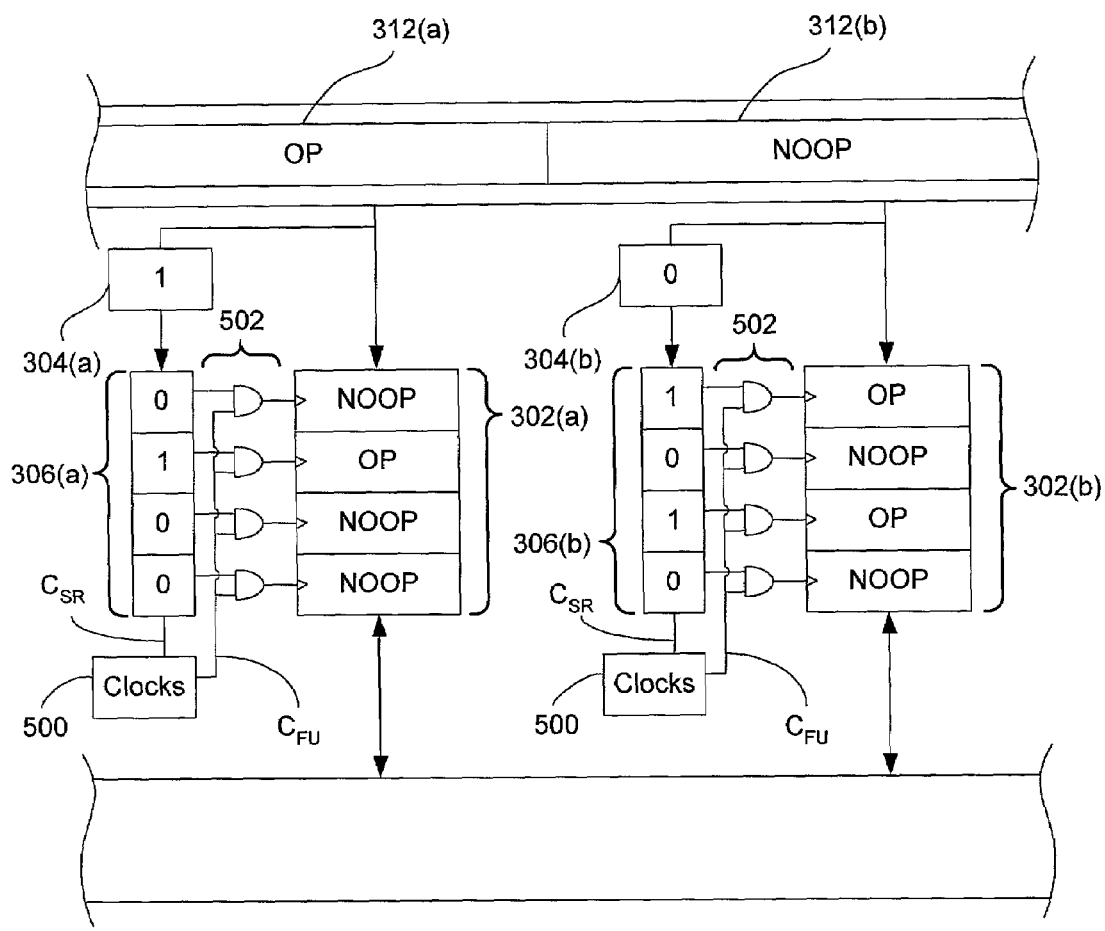
FIG. 5 illustrates an enlarged view of two of the functional units from within VLIW process architecture of FIG. 3.

To provide further explanation as to the invention embodied in FIG. 3, FIG. 5 illustrates an enlarged view of two of the functional units 302 from within process architecture 300. The two functional units 302(a) and 302(b) can be any two of the functional units 302 from FIG. 3. In the enlarged view of FIG. 5, further details of the present invention are shown. For example, clocks 500 are shown to be connected to the stage activation controllers 306(a) and 306(b), and to the functional units 302(a) and 302(b). Also shown in FIG. 5 are clock and no-clock markers within stage activation controllers 306(a) and 306(b), and the instruction types within instruction slots 312(a) and 312(b), and within each of the stages of the functional units 302(a) and 302(b). In alternative embodiments, the number of stages within each of the functional units may be different.

The clocks 500 send clock signals at regular intervals to their respective stage activation controllers and functional units. The phase of the clock cycles responsible for the signals sent to the stage activation controllers, $C_{SR}$, are set slightly ahead of the phase for the clock cycles responsible for the signals sent to the functional units, $C_{FU}$. In this manner, the stage activation controllers 306 are first loaded with a new set of clock and no-clock markers which then allows the appropriate stages of the functional units 302 to receive power and execute the operation type instructions. The phase of the clock signals to the stage activation controllers, $C_{SR}$, must be ahead in phase by at least the time it takes to advance the markers within the stage activation controllers (Ts), plus the time it takes to register the outputs (Tr) and the gate delay (Tg) of the clock gate to the functional units.

The stage activation controllers 306(a) and 306(b), in the embodiment shown in FIG. 5, are shift registers. The register sizes, meaning the number of bits, are equal to the number of stages in their respective functional units 302(a) and 302(b). In alternative embodiments, the size of the shift registers may be larger than the number of stages with the functional units. As with the convention for referencing the stages of the functional units, the bit positions of the registers are also identified in numerical from first to last. The first position being the position into which the newly generated clock signals are sent, and the last being the last position from which clock signals exit the shift registers. Each of the bit positions is connected to an associated stage of a functional unit 302. Also, each of the bit positions within the stage activation controllers contains a clock or no-clock marker associated with either an operation type or a no-operation type instruction, respectively. In this embodiment of the invention, a clock marker and a no-clock marker are 1-bits and 0-bits, respectively. The relationship between bit values and operation types can be seen in FIG. 5 wherein 0-bit register positions are connected to stages containing NOOPs, and 1-bit register positions are connected to stages containing OPs. The bit value clock markers within the shift registers serve as inputs to logic gates 502 that either allow or prevent clock signals $C_{FU}$ from reaching the stages of the functional units 302.

In FIG. 5, the instruction within instruction slot 312(a) is evaluated by instruction evaluation unit 304(a), and the instruction within instruction slot 312(b) is evaluated by instruction evaluation unit 304(b). Instruction evaluation unit 304(a) has determined the instruction within instruction slot 312(a) to be an operation type instruction and therefore has generated and will transmit a 1-bit value to shift register 306(a) in its next clock cycle. Instruction evaluation unit 304(b), in a similar manner, has generated a 0-bit value for a no-operation type instruction.

FIGS. 6A–6E are now presented to show a dynamic flow of instructions and clock markers through functional unit 302(a) and stage activation controller 306(a). The illustration of the flow of instructions and clock markers in FIGS. 6A-6E is an exemplary representation of the flow that may occur in any of the other functional units and stage activation controllers in architecture 300 of FIG. 3. In the illustrated embodiment of the present invention, the functional unit 302(a) is pipelined such that successive instructions progress through each of the functional stages until the instructions exit the last stage and are transmitted to a memory unit. It should be noted however, that the present invention may be implemented in a system that has non-pipelined functional units as well.

Figure 6A:
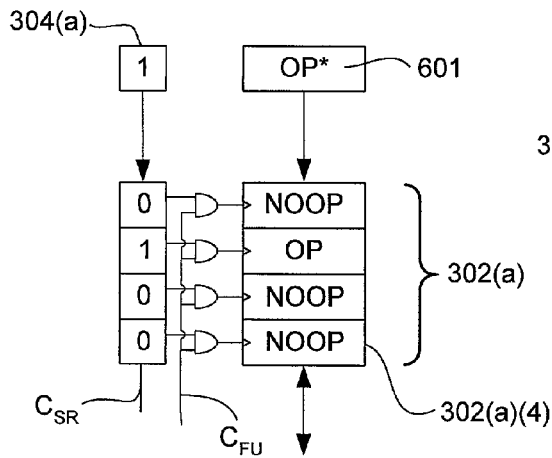
FIGS. 6A–6E show a dynamic flow of instructions and clock markers through a functional unit and stage activation controller.

FIG. 6A illustrates functional unit 302(a) at time $t_1$, which is in the same state as functional unit 302(a) in FIG. 5. Operation type instruction, OP*, 601, has been marked with and asterisk (*) so that the reader may more easily identify the operation type instruction 601. OP* 601 serves as a reference point allowing the reader to more easily follow and understand the dynamic flow in FIGS. 6A–6E.

Figure 6B:
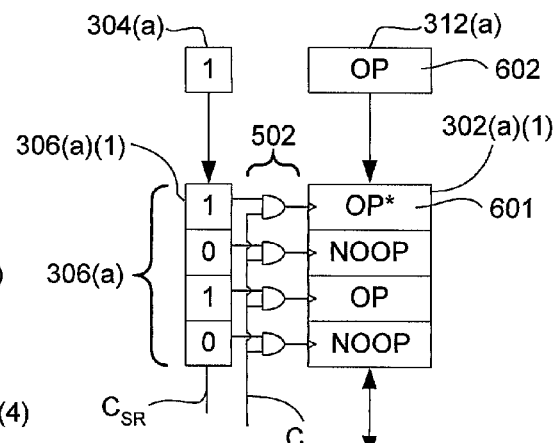

FIG. 6B represents the functional unit 302(a) at the next clock cycle, time $t_2$. At time $t_2$, a clock signal $C_{SR}$ has already been sent to the shift register 306(a) which causes the 1-bit value in the instruction evaluation unit 304(a) to be transmitted to the first bit position 306(a)(1). Clock signal $C_{SR}$ also causes the clock markers already in the shift register 306(a) to be shifted into the next bit positions. Clock signal $C_{FU}$, sent to the functional stages through the logic gates 502 will either reach the functional stages, or not, depending upon the bit-value in the respective shift register position. At time t2, OP* has reached the first stage 302(a)(1) of the functional unit 302(a) and the 1-bit value corresponding to OP* has reached the first bit position 306(a)(1). The other instructions within the stages of the functional unit have also shifted to the next stages. The NOOP in the last stage 302(a)(4) of the functional unit at time t1 has exited the functional unit. Since both the bit-value clock markers and the instructions have both shifted forward, the stages into which operation type instructions have entered will draw current from a power source (not shown). At the same time, the stages into which no-operation type instructions have entered will not draw current. The next instruction 602, another operation type instruction, has been loaded into the instruction slot 312(a), which was formerly occupied by OP*. Instruction evaluation unit 304(a) has generated another 1-bit value that corresponds with the new operation type instruction 602.

Figure 6C:
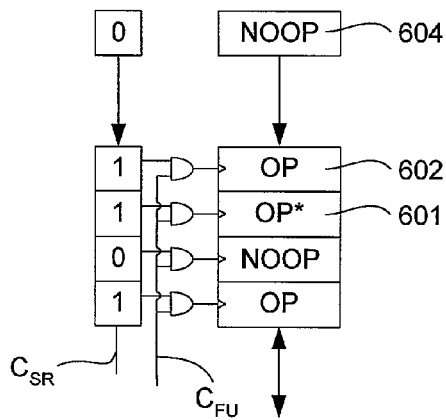

FIG. 6C represents the functional unit 302(a) at the next clock cycle, time $t_3$. At $t_3$, OP* and its corresponding 1-bit have reached the second stage and second bit-position, respectively, of the functional unit 302(a) and shift register 306(a). Also, the instructions and bit clock markers in the other stages and bit positions have advanced forward, the instruction 602 from the instruction slot 312(a) has entered the first stage 302(a)(1), and the NOOP instruction in the last stage 302(a)(4) has exited the functional unit. Also at t3, the next instruction 604 has been loaded into the instruction slot 312(a) and the instruction evaluation unit 304(a) has generated corresponding 0-bit value. Just as in FIG. 6A, the bit value clock markers at t3 allow only the stages having operation type instructions to draw current. Specifically, this means that the first, second and third stages draw current.

Figure 6D:
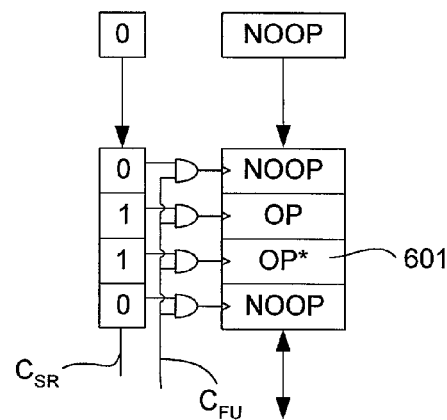
Figure 6E:
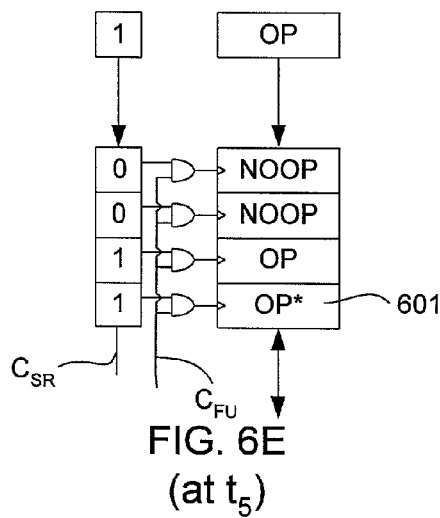

FIGS. 6D and 6E show the functional unit 302(a) at times t4 and t5. In a similar fashion, the bit value clock markers and the instructions have advanced through the system and only the stages having operation type instructions draw current. At t4, OP* has reached the third stage and at t5, OP* has reached the last stage. At a time after t5, OP* will have exited the functional unit.

Figure 7:
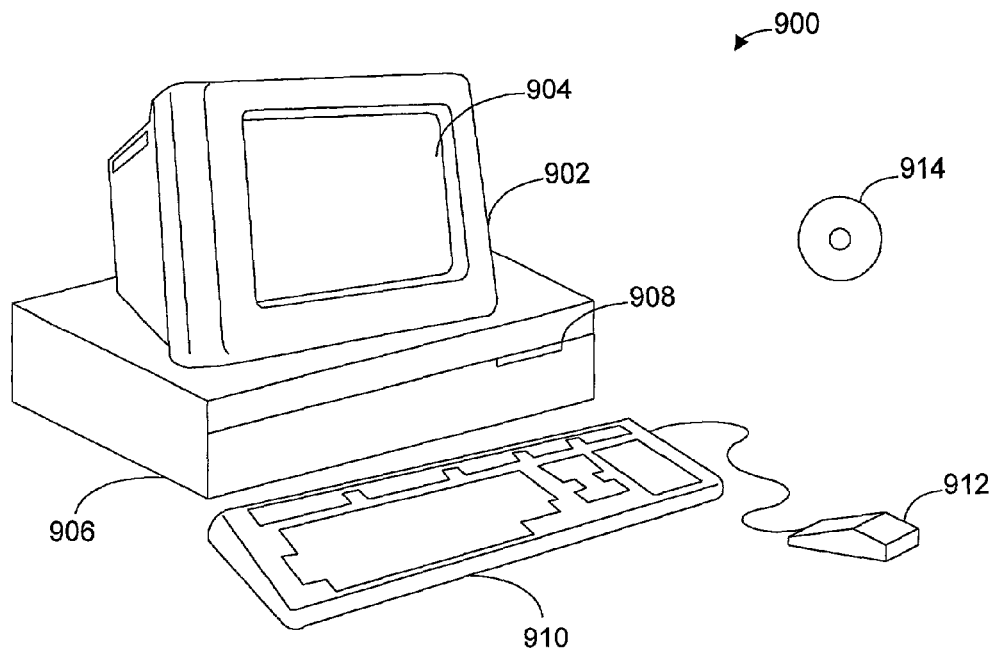
FIGS. 7 and 8 illustrate a computer system suitable for implementing embodiments of the present invention.
Figure 8:
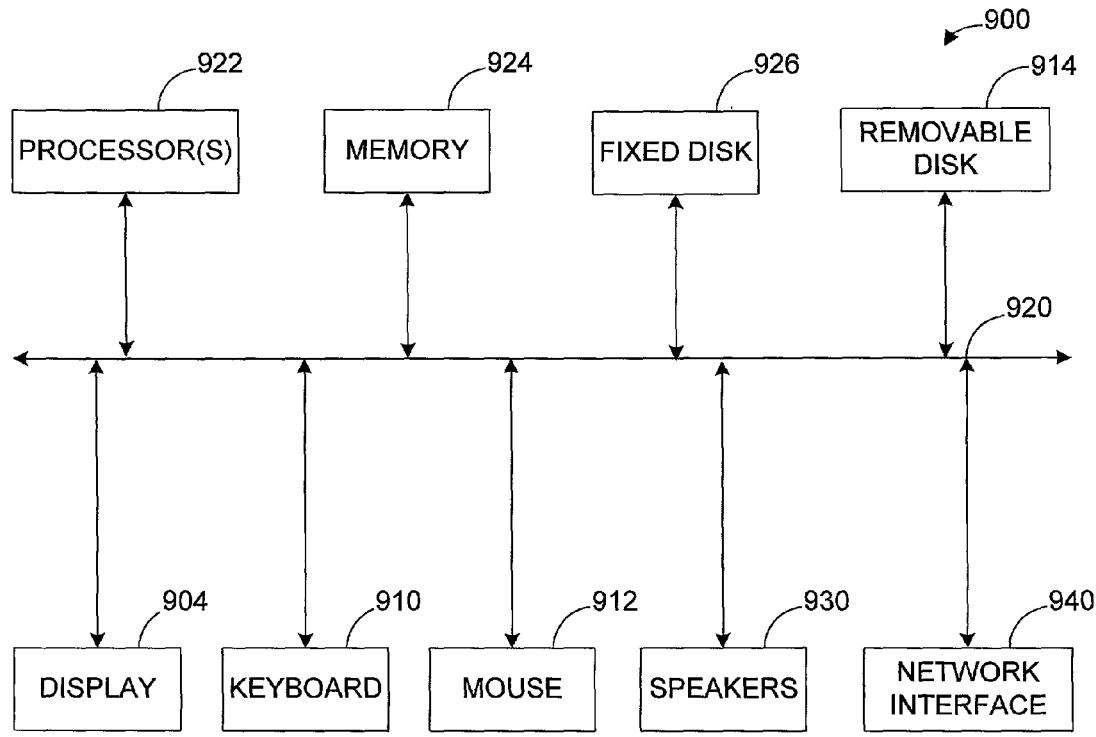

FIGS. 7 and 8 illustrate a computer system 900 suitable for implementing embodiments of the present invention. FIG. 7 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8 is an example of a block diagram for computer system 900. Attached to system bus 920 are a wide variety of subsystems. Processor(s) 922 (also referred to as central processing units, or CPUs) are coupled to storage devices including memory 924. In one embodiment, the processor(s) 922 can be a VLIW processor. Memory 924 includes random access memory (RAM) and read-only memory (ROM). As is well known in the art, ROM acts to transfer data and instructions uni-directionally to the CPU 922 and RAM is used typically to transfer data and instructions in a bidirectional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

I claim:

1. A microprocessor that operates in a manner that conserves power, the microprocessor comprising:
   an instruction register for temporarily storing a next instruction to be executed;
   an instruction evaluation unit that is connected to said instruction register such that said instruction evaluation unit receives said next instruction from said instruction register, said instruction evaluation unit being configured to evaluate said next instruction in order to produce activity indicators by reading an operation type from the instruction and providing an associated signal comprising one of a clock marker or a no-clock marker based upon the operation types of said instructions;
   a functional unit for executing instructions, said functional unit having a plurality of stages, each of said stages capable of being separately activated or deactivated based upon a respective activity indicator, where said stages of said functional unit are arranged in series;
   a memory unit for receiving and registering outputs from the functional unit wherein the amount of time required to register an output from the functional unit comprises time $T_r$;
   a stage activation controller that is connected to said instruction evaluation unit and includes logic gates that utilize said activity indicators in conjunction with a stage activation controller clock pulse $C_{SR}$ to determine which of said stages are to be activated or deactivated and wherein the signal comprising one of a clock marker or a no-clock marker is advanced through a shift register of the stage activation controller such that it takes time $T_g$ to advance each signal comprising one of a clock marker or a no-clock marker a shift register in the stage activation controller;
   a clock circuit that supplies the stage activation controller clock pulse $C_{SR}$ to said stage activation controller and also provides a functional unit clock pulse $C_{FU}$ to said functional unit wherein the clock pulse $C_{FU}$ is subject to a gate delay of time $T_g$, and wherein said functional unit clock pulse $C_{FU}$ is time-delayed with respect to said stage activation controller clock pulse $C_{SR}$ by an amount of time greater than the sum of times $T_g$, $T_r$, and $T_g$ thereby enabling the respective stage of the functional unit to have its power status adjusted depending the requirements of the instruction entering said respective stage of the functional unit.

2. A microprocessor as recited in claim 1 wherein the microprocessor is a very long instruction word processor.

3. A microprocessor as recited in claim 1 wherein each of said stages have separate inputs for receiving current, the inputs capable of being separately opened or closed, the activated stages having opened inputs and the deactivated inputs having closed inputs.

4. A microprocessor as recited in claim 1 wherein the stage activation controller is a memory unit that stores said activity indicators.

5. A microprocessor as recited in claim 4 wherein said memory unit is a register having a bit size equal to the number of stages in said functional unit, each bit location storing a respective activity indicator which indicates whether to activate or deactivate a respective stage.

6. A microprocessor as recited in claim 1 further comprising a plurality of functional units, each of said functional units having a plurality of stages, each of said stages capable of being separately activated or deactivated based upon a respective activity indicator.

7. A microprocessor as recited in claim 6 further comprising a plurality of stage activation controllers, each of said stage activation controllers using said activity indicators to individually activate or deactivate each of said stages of a respective one of the plurality of functional units.

8. A microprocessor as recited in claim 7 further comprising a plurality of instruction evaluation units, each of said instruction evaluation units associated with a respective one of said stage activation controllers.

9. A microprocessor as recited in claim 1 wherein the logic gates of the stage activation controller comprise AND type gates.

* * * * *